United States Patent
Kast et al.

(10) Patent No.: US 12,076,865 B2
(45) Date of Patent: Sep. 3, 2024

(54) METHOD, COMPUTER PROGRAM PRODUCT AND ROBOT CONTROL SYSTEM FOR THE CONTACT-BASED LOCALIZATION OF OBJECTS THAT CAN BE MOVED WHEN MANIPULATED BY ROBOT, AND ROBOT

(71) Applicant: Siemens Aktiengesellschaft, Munich (DE)

(72) Inventors: Bernd Kast, Ichenhausen (DE); Philipp Sebastian Schmitt, Munich (DE); Florian Wirnshofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 143 days.

(21) Appl. No.: 17/610,168

(22) PCT Filed: May 11, 2020

(86) PCT No.: PCT/EP2020/063067
§ 371 (c)(1),
(2) Date: Nov. 10, 2021

(87) PCT Pub. No.: WO2020/234027
PCT Pub. Date: Nov. 26, 2020

(65) Prior Publication Data
US 2022/0226991 A1    Jul. 21, 2022

(30) Foreign Application Priority Data
May 17, 2019 (EP) .................................. 19175195
Jun. 5, 2019 (EP) .................................. 19178454

(51) Int. Cl.
*B25J 9/16* (2006.01)
*B25J 13/08* (2006.01)
*G05B 19/4155* (2006.01)

(52) U.S. Cl.
CPC ........... *B25J 9/1633* (2013.01); *B25J 13/088* (2013.01); *G05B 19/4155* (2013.01); *G05B 2219/50391* (2013.01)

(58) Field of Classification Search
CPC ... B25J 13/088; B25J 9/16; B25J 9/161; B25J 9/1656; B25J 9/1633; G05B 19/4155;
(Continued)

(56) References Cited

U.S. PATENT DOCUMENTS 8,831,778 B2 * 9/2014 Pitzer .................. G05D 1/0274
700/250
2007/0073442 A1    3/2007 Aghili
(Continued)

FOREIGN PATENT DOCUMENTS

CN    102596085 A    7/2012
CN    103926847 A    7/2014
(Continued)

OTHER PUBLICATIONS

Zhang et al. "A Dynamic Bayesian Approach to Real-Time Estimation and Filtering in Grasp Acquisition", IEEE (Year: 2013).*
(Continued)

*Primary Examiner* — Adam R Mott
*Assistant Examiner* — Sagar KC
(74) *Attorney, Agent, or Firm* — Schmeiser, Olsen & Watts LLP

(57) ABSTRACT

At least one robot is disclosed for object manipulation, on the basis of a probabilistic approach without object detection by visual sensors, a probability distribution is determined approximately by an iterative, recursive application of a Bayes filter algorithm, wherein state transition probabilities obtained, in a nondeterministic motion model for system simulation, are multiplicatively linked with measurement probabilities obtained at the start of the application. For this
(Continued)

purpose, a physics simulator which completely includes the physics of the system with respect to forces and dynamics and the physical system relationships resulting therefrom, and a controller, which controls the physics simulator while at the same time the simulation system state is fed back and which influences the compliance of the robot with respect to the robot-object environment on the basis of control variables, are incorporated, and measurement results of axis-specific measurements are taken into account in the measurement model for the plausibility checks.

14 Claims, 1 Drawing Sheet

(58) Field of Classification Search
CPC .......... G05B 2219/50391; G05B 2219/39013; G05B 2219/39018
See application file for complete search history.

(56) References Cited

U.S. PATENT DOCUMENTS

| | | | |
|---|---|---|---|
| 2010/0306159 A1* | 12/2010 | Platt | B25J 9/1612 901/46 |
| 2011/0118752 A1 | 5/2011 | Itkowitz | |
| 2011/0129119 A1 | 6/2011 | Eggert | |
| 2014/0011518 A1 | 1/2014 | Valaee | |
| 2015/0052092 A1 | 2/2015 | Tang et al. | |
| 2015/0279031 A1 | 10/2015 | Cavusoglu et al. | |
| 2016/0023351 A1 | 1/2016 | Kuffner | |
| 2016/0025615 A1 | 1/2016 | Fishel | |
| 2017/0161946 A1 | 6/2017 | Aghamohammadi et al. | |
| 2018/0161986 A1 | 6/2018 | Kee et al. | |
| 2018/0311819 A1 | 11/2018 | Thomas et al. | |

FOREIGN PATENT DOCUMENTS

| | | |
|---|---|---|
| CN | 104382595 A | 3/2015 |
| CN | 105143909 A | 12/2015 |
| CN | 106325284 A | 1/2017 |
| CN | 107671857 A | 2/2018 |
| CN | 108153153 A | 6/2018 |
| CN | 109492256 A | 3/2019 |
| KR | 20120008211 A | 1/2012 |
| KR | 101784500 B1 | 10/2017 |
| WO | 2016014774 A1 | 1/2016 |

OTHER PUBLICATIONS

K. Nottensteiner et al.: "Narrow passage sampling in the observation of robotic assembly tasks" in 2016 IEEE International Conference on Robotics and Automation (ICRA), May 2016, pp. 130-137.
F. Wirnshofer et al.: "State Estimation in Contact-Rich Manipulation"; IEEE International Conference on Robotics and Automation (ICRA), May 20-24, 2019 in Montreal.
K. Lowry et al.: "Real-time state estimation with whole-body multi contact dynamics: A modified ukf approach" in 2016 IEEE-RAS 16th International Conference on Humanoid Robots, Nov. 2016, pp. 1225-1232.
D. J. Duff et al.: "Motion estimation using physical simulation" in 2010 IEEE International Conference on Robotics and Automation, May 2010, pp. 1511-1517.
"https://en.wikipedia.org/wiki/Particle_filter" in the version of May 10, 2019.
"Multiplicative", 1 page, retrieved on Nov. 16, 2023 from the Internet: <URL: https://www.vocabulary.com/dictionary/multiplicative>.
"Mutliplicative" 1 page, retrieved on Nov. 16, 2023 from the Internet: <URL: https://www.merriam-webster.com/dictionary/multiplicative.>.
"Multiplicatively", 1 page, retrieved on Nov. 16, 2023 from the Internet: <URL: https://dictionary.cambridge.org/us/dictionary/english/multiplicatively.>.
Koval Michael C. et al., Pose estimation for planar contact manipulation with manifold particle filters, The International Journal of Robotics Research, 2015, vol. 34 (922-945).
Koval Michael C. et al, Pose Estimation for Contact Manipulation with Manifold Particle Filters, 2013 IEEE/RSJ, International Conference on, Intelligent Robots and Systems (IROS) Nov. 3-7, 2013. Tokyo, Japan , 8 pages.
Wirnshofer Florian et al, Robust, Compliant Assembly via Optimal Belief Space Planning, 2018 IEEE International Conference on Robotics and Automation (ICRA) , Brisbane, Australia, p. 5437-5443 , May 21-25, 2018.

* cited by examiner

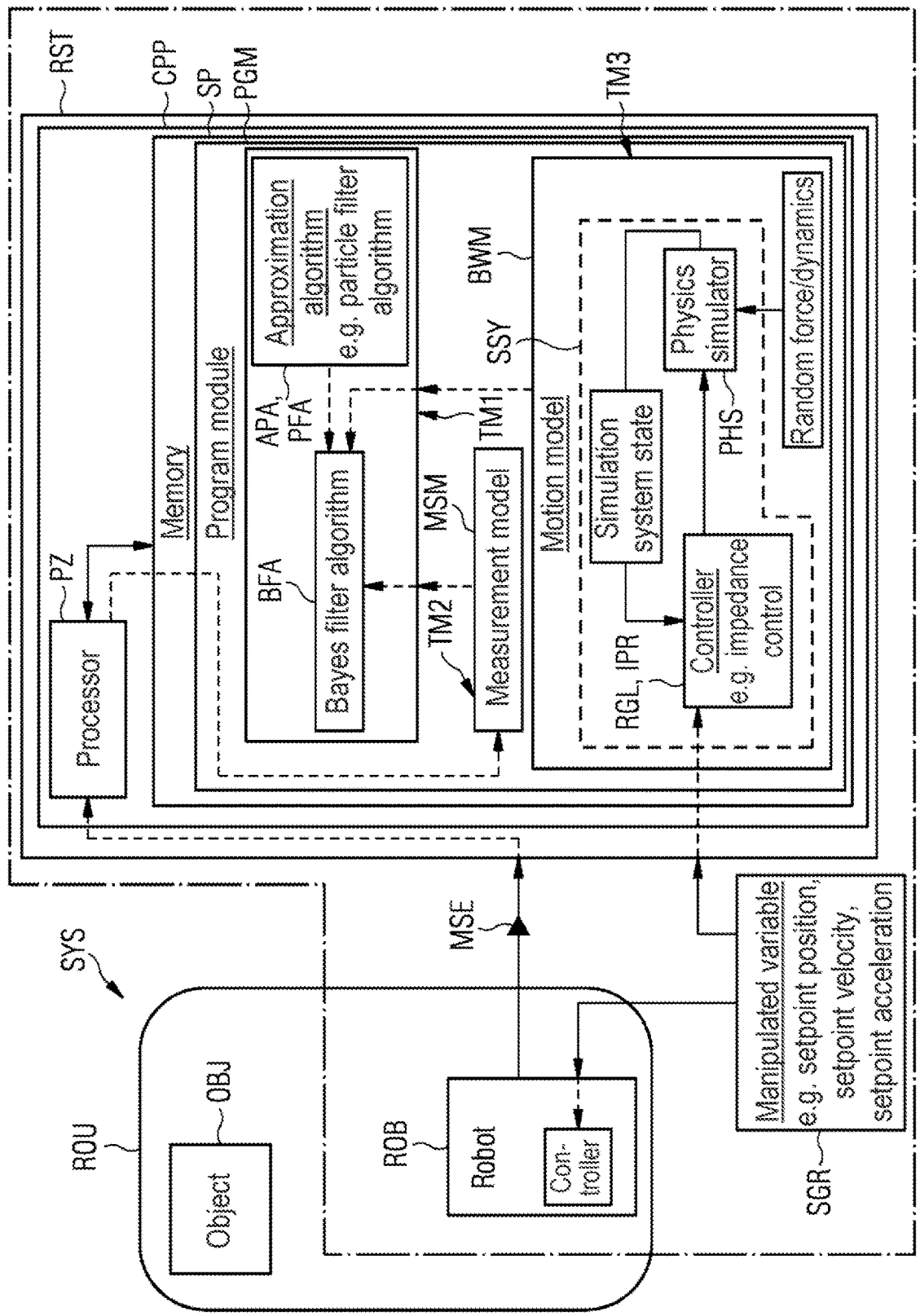

METHOD, COMPUTER PROGRAM PRODUCT AND ROBOT CONTROL SYSTEM FOR THE CONTACT-BASED LOCALIZATION OF OBJECTS THAT CAN BE MOVED WHEN MANIPULATED BY ROBOT, AND ROBOT

CROSS-REFERENCE TO RELATED APPLICATIONS

This application claims priority to PCT Application No. PCT/EP2020/063067, having a filing date of May 11, 2020, which claims priority to EP Application No. 19178454.5, having a filing date of Jun. 5, 2019, and EP Application No. 19175195.7, having a filing date of May 17, 2019, the entire contents all of which are hereby incorporated by reference.

FIELD OF TECHNOLOGY

The following relates to a method for the contact-based localization of objects that can be moved when manipulated by a robot, a computer program product for the contact-based localization of objects that can be moved when manipulated by the robot, and a robot control system for the contact-based localization of objects that can be moved when manipulated by the robot.

BACKGROUND

The localization of an object that can be moved when manipulated by a robot, e.g., a workpiece or any other article, is an essential process for safe manipulation in which the movable object to be manipulated, particularly if the latter by definition is not situated at a location for handling or can be transported and delivered there—i.e., the object is not within reach for a robot—, is detected and tracked, thus e.g., using robot-inherent sensors.

The robot used for the object manipulation— which is why it is often also referred to as a manipulator— is either an automaton equipped with gripping arms which, under remote control and with the assistance of sensors and programming, effects mechanical activities as a human substitute in the industrial sphere, or a machine resembling a human or a movable automaton which performs functions of a human in various technical fields.

A central problem here is that at times at which the precision of the object recognition/object tracking is the most important, the conventional localization methods, e.g., by a camera, fail. The precise object pose is required particularly if the machine interacts with the object (e.g., gripping, placement, etc.) or objects come into contact with one another (e.g., during assembly).

One known approach involves first of all localizing the object in a camera-based manner while there is no obscuration and performing the rest of the manipulation process on an "open loop" basis. This approach fails if disturbances influence the object pose in the remainder of the process.

The scientific literature contains a number of approaches for localizing objects in a contact-based manner. See [1], [2], [3].

However, none of the existing approaches covers all the requirements made of an algorithm for object recognition/object tracking. These requirements are:

Arbitrary robot kinematics and arbitrary robot and object geometries must be able to be dealt with.
The complete object pose including velocity, i.e., an object state, must be determined, possibly even for a plurality of objects simultaneously. The pose of an object is understood to mean, in particular, a position and/or an orientation of the object. This means that no assumptions are made which reduce the number of dimensions.
Multimodal object distributions must be able to be represented. This means that a precise initial estimation cannot be taken as a basis.
The method must operate in real time.
Movable objects must be localized in a contact situation.

Camera-based methods are problematic here since robot and object mutually obscure one another.

For this reason, it would be very helpful to have a contact-based recognition system which determines the object pose on the basis of measurements of robot configuration (e.g., axial position/axial velocity) and measured interaction forces.

The problem addressed by embodiments of the invention is to specify a method, a computer program product (non-transitory computer readable storage medium having instructions, which when executed by a processor, perform actions) and a robot control system for the contact-based localization of objects that can be moved when manipulated by robot in which the object localization is performed taking account of the aforementioned catalog of requirements on the basis of a probabilistic approach without object detection by visual sensors, such as e.g., a camera.

The concept underlying embodiments of the invention in accordance with the technical teaching consists in localizing an object that is movable during the manipulation by at least one manipulated-variable-controlled robot, which object together with the robot in a robot-object environment forms a system for system state estimation, wherein, for the system state estimation associated with the object localization, a probability distribution that localizes the object is determined approximately by an iterative-recursive application of a Bayes filter algorithm and in this case state transition probabilities obtained, in a nondeterministic motion model for system simulation, from modeled transitions of states of the system are multiplicatively combined with measurement probabilities obtained, in a measurement model for system simulation, from modeled plausibility checks of the system state transitions modeled in the motion model, and an initial probability distribution is used at the beginning of the iterative-recursive application. For this purpose, a physics simulator for system state simulation, the physics simulator completely including the physics of the system in regard to forces and dynamics and the resultant physical relationships of the system components, and a controller that controls the physics simulator with the simulation system state being fed back and effects or realizes the compliance of the robot with respect to the robot-object environment on the basis of a manipulated variable are included in the motion model, and measurement results of axis-specific measurements are taken into account in the motion model for the plausibility checks.

In this case, the essential aspects of the probabilistic approach are the variables of a probability distribution, the motion model and the measurement model, wherein each hypothesis about the system state (particles) includes the object pose and the object velocity and also the robot pose and the robot velocity.

What is advantageous here in particular is the localization in real time of one or more objects, e.g., workpieces, with arbitrary geometry, with arbitrary robots/automata and from an arbitrary initial situation.

In this case, for a development of embodiments of the invention, it is advantageous to use a particle filter algorithm for the approximation of the Bayes filter algorithm in the iterative-recursive determination of the probability distribution.

In order to be able to effect, realize or provide the compliance of the robot with respect to the robot-object environment, the manipulated variable is formed from a setpoint position, setpoint velocity and/or a setpoint acceleration.

In order to achieve this compliance, it is also possible, however, that the controller is operated as an impedance controller, in which an impedance control is used for the compliant control of the controller.

The axis-specific measurements carried out on the robot for the plausibility checks in the measurement model concerns the axial kinematics, at least one axial kinematic variable from axial position, axial velocity, axial acceleration and axial torque is measured and the measurement result respectively obtained therefrom is used.

Further advantages of embodiments of the invention will become apparent from the following description of one exemplary embodiment of the invention with respect to a single FIGURE and to the subsequently published non-patent literature by F. Wirnshofer et al. "State Estimation in Contact-Rich Manipulation"; IEEE International Conference on Robotics and Automation (ICRA), May 20-24, 2019 in Montreal—designated hereinafter as "Wirnshofer et al.".

BRIEF DESCRIPTION

Some of the embodiments will be described in detail, with reference to the following FIGURES, wherein like designations denote like members, wherein:

The FIGURE shows a robot control system RST for the contact-based localization of an object OBJ that can be moved when manipulated by a manipulated-variable-controlled robot ROB. The FIGURE shows only one robot.

DETAILED DESCRIPTION

However, in the context of a further exemplary embodiment, it is conceivable that a plurality of robots might want to manipulate the movable object or a plurality of movable objects [cf. Wirnshofer et al.; (FIG. 1), (FIG. 2), (FIG. 6—Cube-2)].

The manipulation of the object OBJ by the robot ROB takes place in a robot-object environment ROU. In accordance with the explanations in Wirnshofer et al., the robot-object environment ROU is e.g., a tabletop with a box on which the object, e.g., a cube, is situated [cf. Wirnshofer et al.; (FIG. 4), (FIG. 6—Cube-Box)].

In accordance with Wirnshofer et al., for example, the robot ROB is an automaton equipped with gripping arms which, under remote control and with assistance of sensors and programming, effects mechanical activities as a human substitute in the industrial sphere.

It goes without saying that any other arbitrary robot-object environment ROU may also be appropriate for the contact-based localization of an object that can be moved when manipulated by a robot.

According to the FIGURE, the robot ROB, the movable object OBJ and the robot-object environment ROU form a system SYS, wherein the robot ROB, the movable object OBJ and the robot-object environment ROU are system components. This system SYS is a "real system", which can be present or exist in this way in various technical domains, e.g., with the outlined robot manifestation in industrial automation. In contrast thereto, a simulation of this system SYS is simulated in the robot control system RST and a state estimation of the system SYS based on a probabilistic approach takes place on the basis of this simulation using known algorithms. In this simulation, the system state to be estimated is associated with the object localization in the real system SYS and a statement can therefore be made about the possible whereabouts of the object.

The robot control system RST contains a computer program product CPP for the contact-based localization of the object OBJ that can be moved when manipulated by the robot ROB and can be part of the robot ROB e.g., —as illustrated by the dash-dotted "lasso" in the FIGURE—as an independently embodied unit sold separately on the market. In this case, robot control system and robot can, but need not, be from the same manufacturer.

The computer program product CPP contains a nonvolatile, readable memory SP, in which processor-readable control program instructions of a program module PGM that carries out the object localization are stored, and a processor PZ, which is connected to the memory SP and executes the control program instructions of the program module PGM for object localization.

Analogously to the robot-robot control system consideration above, now in a robot control system-"computer program product" consideration, the computer program product CPP, or more precisely the program module PGM that carries out the object localization, which in each case is configured, constituted or embodied as an APP or else constitutes part of a programming environment or of an "Application Programming Interface <API>" for the robot control system, can likewise be sold on the market autonomously and independently of the robot control system as a separate product from a manufacturer A and then be used in an arbitrary robot control system from a manufacturer B.

The program module PGM is composed of three submodules, which functionally interact for the system state estimation or during the object localization.

A Bayes filter algorithm BFA and an approximation algorithm APA are contained and implemented in terms of programming and software in a first submodule TM1, wherein both algorithms correspondingly functionally interact, as far as the depicted arrow direction is concerned.

The second submodule TM2 comprises a measurement model MSM, which again correspondingly functionally interacts with the first submodule TM1 in the manner illustrated, as far as the depicted arrow direction is concerned.

The same applies to a third submodule TM3 with regard to the functional interaction with the first submodule TM1. The third submodule TM3 comprises a motion model BWM, which also correspondingly functionally interacts concomitantly in the manner illustrated, as far as the depicted arrow direction is concerned. A physics simulator PHS for system state simulation, the physics simulator completely including the physics of the system SYS in regard to forces and dynamics and the resultant physical relationships of the system components, and a controller RGL that controls the physics simulator with the simulation system state being fed back are realized or implemented in terms of programming and software in the motion model BWM. The two components, the physics simulator and the controller RGL, form a deterministic simulation system SSY. The motion model BWM is accordingly also deterministic. However, if the physics simulator PHS of the simulation system SSY is subjected to a random force and/or dynamics, then the physics simulator is noisy in terms of its behavior. On account of this noisiness, both the simulation system SSY and the motion model BWM become nondeterministic. Further details about this will be discussed later in the course of the further technical consideration of embodiments of the invention.

For the functional control of the physics simulator PHS, a manipulated variable is applied to the controller RGL, which manipulated variable, in order to be able to operate the controller RGL in an impedance-controlled manner, as an impedance controller IPR, can be either a setpoint position, a setpoint velocity or a setpoint acceleration. As a result of the manner of applying the manipulated variable to the controller RGL and the associated operation of the controller as an impedance controller, the robot behaves compliantly with respect to the robot-object environment ROU in the system state simulation. Further details about this aspect, too, will be discussed later in the course of the further technical consideration of embodiments of the invention.

The processor PZ in the computer program product CPP then determines a probability distribution that localizes the object OBJ by way of the execution of the control program instructions of the program module PGM for object localization for the state of the system SYS formed by the system components mentioned, the state being associated with the object localization, in the course of the system state estimation already mentioned. This determination is effected by the iterative-recursive application of the Bayes filter algorithm BFA contained and implemented in the program module PGM. The algorithm constitutes in principle a Bayes filter that yields the probability distribution during an iterative-recursive application.

During the iterative-recursive application of the algorithm for determining the probability distribution, state transition probabilities obtained, in accordance with the motion model BWM for system simulation, under the prerequisite that the motion model is nondeterministic, from modeled transitions of states of the system and measurement probabilities obtained, in accordance with the measurement model MSM for system simulation, from modeled plausibility checks of the system state transitions modeled in accordance with the motion model BWM are multiplicatively combined.

In accordance with the measurement model MSM, for the plausibility checks during the iterative-recursive application of the algorithm for determining the probability distribution, axis-specific measurements, e.g., concerning the axial kinematics, are carried out on the robot ROB and measurement results MSE resulting therefrom are taken into account in the measurement model MSM. The measurement results MSE for the plausibility checks are results from measurements of axial position, axial velocity, axial acceleration and/or axial torque of the robot ROB. The measurement and the taking account of the measurement results are illustrated in principle in the FIGURE by the dashed arrow of action from the robot ROB, via the processor PZ through to the measurement model MSM. The actual taking account occurs in the processor PZ, however, during the execution of the control program instructions of the program module PGM, specifically in the course of the determination of the probability distribution.

During the iterative-recursive application of the algorithm for determining the probability distribution, an initial probability distribution and, on account of the complexity of the system state estimation [cf. in this respect the explanations in the course of the further technical consideration of embodiments of the invention and in Wirnshofer et al.], the approximation algorithm APA are furthermore used at the start. The approximation algorithm APA used is a known particle filter algorithm PFA, which in its implementation constitutes a particle filter [4].

The way in which the determination of the probability distribution as outlined above is realized in detail and what technical aspects should be taken into account in the process will be elucidated with the explanations in the course of the further technical consideration of embodiments of the invention and that in Wirnshofer et al.

A more extensive technical consideration of embodiments of the invention in the context of the exemplary embodiment described above is based on the subsequently published non-patent literature by F. Wirnshofer et al. "State Estimation in Contact-Rich Manipulation"; IEEE International Conference on Robotics and Automation (ICRA), May 20-24, 2019 in Montreal, which, on the basis of references below in association with this consideration and in the context of the technical teaching disclosed in the present patent application, should be regarded explicitly as additional disclosure relevant to embodiments of the invention.

In order that objects that can be moved when manipulated by robot can be localized in a contact-based manner, a probabilistic approach is pursued in accordance with the exemplary embodiment.

In order that the position, velocity or more generally the state of a movable object and the manipulation thereof by a robot can be estimated, in principle there is access to two things for the estimation. This does not just apply to the present estimation complex, rather it applies more generally to estimations of any type.

For the estimation complex concerning embodiments of the invention, firstly a model is available regarding how a system consisting of at least one robot or manipulator (robot for object manipulation) and at least one object that is movable in space behaves physically, and secondly system-related measurements are available.

If an object is lying on a tabletop, etc., then it is known to be static. A space with permissible estimations is then assumed and the system-related measurements are available, which take place e.g., by a camera or by sensors at axial positions of the robot.

In accordance with the exemplary embodiment, exclusively position sensors at the axes of the manipulator or robot are considered and, of course, the model knowledge about the system is taken into account. The camera-based localization of the object—as already mentioned in the introduction—is not the subject of the present consideration.

Typical model knowledge that is available is:

The geometry of the robot is known. The geometry of the individual parts of the system (at least one robot, at least one object and the tabletop) is known and it is known that these parts do not mutually penetrate one another. That is model knowledge which could be used. However, this type of model knowledge is not utilized directly here. In other words, it is not assumed that the parts do not penetrate one another. Instead, a physics simulation is carried out, which is a highly detailed physical model of the system. In the physics simulator moreover, it will automatically be the case that penetration does not take place because the physics simulator prevents system parts from mutually penetrating one another.

The physics/mathematics behind the physics simulator is explained in Wirnshofer et al. in chapter III; A) "Rigid Body Motion and Contact Dynamics". The physical principles explained there are packaged in this physics simulator or are a corresponding part of that and of the physical system model.

In order to estimate the state of the object, unlike in the conventional art, a subset of the entire states is not considered— in other words, it is not stated that the object is nailed to the tabletop and then only a Z-component is available or something else with a comparable effect is done or velocities are ignored— no, instead the full system state of all positions and rotations of the object plus the velocities thereof plus all states of the robot or manipulator are incorporated into a large, complex estimation problem. That is to say that it is firstly assumed that the axial positions of the robot are not known at all. That is not a plausible assumption because for the robot where the latter is situated is known and how fast it is moving is known. All these variables are thus incorporated into the large, complex estimation problem, which is not a good idea at first sight because it enlarges the state space enormously and makes the estimation problem insoluble at first sight.

There is furthermore a second step, which once again does not look like a good idea at first sight. Specifically, it involves considering the complete dynamics of the system. That is to say that it looks at the behavior of the axial torque from the axis to the total acceleration of the entire system including gravitational force, contact forces and friction, as a result of which the complexity of the physical system model increases further.

If this very complex system model is then present, a further, additional assumption is made, specifically that the robot or manipulator is operated with stable control for the entire time. A controller is thus taken into account in the physical simulation.

In other words, stable control is applied to the physics simulator. The physical system model with the physics simulator is extended by a controller model with the controller.

The controller is explained in Wirnshofer et al. in chapter III; B) "Compliant Interaction and Controller Model". It brings about stable control and the relevant controller model, like the physical system model, is taken as a basis for the estimation problem.

This system model consisting of physical system model and controller model and taken as a basis for the estimation problem has the advantage that it is self-stabilizing, at least as far as the robot is concerned, that is to say that if there are no contact forces currently occurring, the robot will always move to its setpoint position and, if this in its entirety is then interpreted afterward as a probabilistic model, the entire probability mass, as far as the robot is concerned, settles at this stable point. The robot does not drift through the area. In other words, although all states have been concomitantly taken into account by the robot, both the positions and the velocities— which can become very many in accordance with the teaching of Wirnshofer et al. in the pictorial illustrations (FIG. 1 and FIG. 2), there thus being e.g., in the case illustrated, where two robots with 14 axes are considered, a total of 28 states with 14 positions and 14 velocities— these states all disappear behind an estimation problem because they all settle and de facto are not there since they are all at the same value.

Beyond the robot there are also, of course, in this consideration of stable control, additionally six degrees of freedom per object, i.e., three positions and three orientations and just as many velocities. They are ultimately condensed to three remaining degrees of freedom per object. The object simply falls down, it remains prone and the velocities disappear. That is the result of the physical model that the object typically falls to one side. Out of the six degrees of freedom two rotational degrees of freedom and one translational degree of freedom are lost and ultimately only three degrees of freedom of the object remain.

Conclusion: Although all variables have been included in the large, complex estimation problem, that is all condensed down afterward to three residual variables of the object.

In the system model, therefore, there is now the combination of physical system model and controller model, as outlined above with reference to Wirnshofer et al. in chapter III; A) and in chapter III; B). These two models then form input variables for the estimation problem. As a further quasi fourth input variable (since, as will be explained further below, measurements or a measurement model are/is provided as third input variable), setpoint position [cf. $q^d_r$ in Wirnshofer et al. in the pictorial illustration (FIG. 3)] and setpoint velocity [cf. $\dot{q}^d_r$ in Wirnshofer et al. in the pictorial illustration (FIG. 3)] of the robot are known because the intended destination of the robot is known. Both variables could either be interpreted as part of the controller or else also be considered explicitly as input variable. It does not matter how this is then considered; a choice can be made in this regard. As a result, the system model for the estimation problem is now characterized in principle.

In Wirnshofer et al. in the pictorial illustration (FIG. 3), the physical model is contained in the block "Forward Dynamics" and the controller model is contained in the block "Controller". The block "Forward Dynamics" is designated as "Forward Dynamics" because it represents and describes the current state of motion of the system, i.e., the position and velocities of all components involved, both manipulator and object, plus the torque applied to the axes of the manipulator. These three things in combination determine how the manipulator and the object accelerate. The expression "Forward Dynamics" was chosen because this describes the development of the system forward. This block "Forward Dynamics" would be implemented as the physics simulator and in the pictorial illustration (FIG. 3) in Wirnshofer et al. it is possible virtually to see in one piece the models used as input variable for the estimation problem.

They are firstly the physics simulator or the physical system model and the controller or the controller model either with the included setpoint position and setpoint velocity or else without the included setpoint position and setpoint velocity. The measurements already discussed are then also required as third input variable for the estimation problem. The measurements used in the context of a measurement model are measurements regarding the axial positions on the robot, which are typically measurable because it is known how far the axis has rotated.

With the system model (physical system model and controller model) and the measurement model, the input variables used for the estimation problem are now present. These input variables are now used in pursuing a probabilistic approach and in modeling a state estimation problem, in the case of which a state of the system is estimated and designated as "belief". This approach leads to a motion model, which is outlined in Wirnshofer et al. in chapter III; C) "Sequential Bayesian Estimation", and the measurement model already mentioned.

A further point in the course of this approach is to use a Bayes filter, or more exactly a Bayes filter algorithm, to calculate the "belief". The algorithm is recursive—in relation to points in time with "$t$" as index— and results from the following variables, an initial (old) "belief", a manipulated variable (designated by "$u_t$" in Wirnshofer et al. in chapter III; C)) and a current measurement.

For concrete implementations of the Bayes filter algorithm, two additional probability distributions are required besides the initial "belief":

1. a state transition probability indicating the probability of transition from a current state to a subsequent state, and
2. a probability of obtaining from a specific state a specific measurement, which is yielded by the measurement model.

In order to be able to implement the Bayes filter algorithm, noisy dynamics of the system—from a state that is not known—are furthermore assumed and it is additionally also assumed that a noisy measurement will be obtained from this state. With these two components (assumptions), it is then possible to use the Bayes filter for state estimation using a suitable approximation.

How is this state estimation model then manifested? Firstly, the motion model is available, which yields the state transition probability, and the measurement model is available, which yields the probability distribution between state and measurement variables.

What does the Measurement Model Include?

Assuming that the robot axes are at a specific current position, thus e.g., rotated by an angular measure of 1000 relative to the previous position, then the measurement yields simply a Gaussian distribution of measured values, the mean value having this 100° angular position.

The motion model describes the probability of transition from a current state for the given manipulated variable (input of the controller; cf FIG. 3 in Wirnshofer et al.) to a subsequent state {cf Wirnshofer et al. in chapter II; C)}. With regard to the current state, the positions and velocities of all components involved (robot and object) in the system are known and as manipulated variable (these are the inputs of the controller; referred to hereinafter as control inputs) the setpoint position [cf. $q^d_r$ in Wirnshofer et al. in the pictorial illustration (FIG. 3)] and the setpoint velocity [cf. $\dot{q}^d_r$ in Wirnshofer et al. in the pictorial illustration (FIG. 3)] are known, which constitute the setpoint variables for the controller.

These control inputs—this being very important—are in principle only representative of the actual physical system characterized by the system model; therefore, the term proxy inputs are also used. The actual direct inputs would be torques since, after all, the robot is controlled by way of these torques.

Since the physical system indeed cannot simply be told to teleport itself toward an arbitrary location, rather it is possible instead only to influence the acceleration as manipulated variable, the abovementioned setpoint variables (setpoint position and setpoint velocity) constitute—as it were as abstraction—the actual inputs. This has the advantage that the controller can be concomitantly included in the system model, whereby the robot ultimately, as already mentioned above, is stabilized.

If instead the torques were considered as the inputs of the system, in principle a double integrator would be available. Accelerations, however, are effectively what can be controlled. By virtue of the function of the double integrator, errors are integrated and the robot drifts somewhere through the area. That is to say that if there is a desire to estimate the current location of a seven-axis robot, and only the torques are available as input, then the latter drifts through a seven-dimensional state space and there is no realistic chance of using any external computer to estimate the current whereabouts of the robot.

If however—in contrast thereto—the indirect control inputs influence the model, then it is known that the controller stabilizes the robot and the seven-dimensional space effectively, as long as no contacts occur, collapses to a zero-dimensional point because the robot simply remains stable. The robot thus moves toward its intended destination.

The difference between the torque as manipulated variable and the setpoint position and the setpoint velocity as manipulated variable can be considered and demonstrated very well on the basis of the example of an "impedance controller at the axial level". This is a thought model. In accordance with this thought model, the impedance controller would simulate an artificial spring. The robot is assumed to have a setpoint position value toward which it is intended to move. This setpoint position is given by a tabletop. The robot moves the manipulator (gripper) by way of its arms in the direction of the tabletop. If it comes into contact with the latter, the robot feels a counterforce. On the basis of the impedance controller, the robot would keep the arm stable and stay at the contact position. If the tabletop then furthermore wanted to attempt to force the gripper of the robot away actively, over and above the counterforce—which is unrealistic from a physical standpoint —, then the robot would work like a rotational spring against a deflection and permit the attempt to be made to force it away. The robot, since there are no integral components in the impedance controller, would indeed not force the situation that it returns to the contact position again. This robot behavior is what is typically liked during the manipulation of objects. There would indeed be no desire for the robot to force its position, since that results in the object being damaged or even destroyed.

This thought model with the impedance controller actually elucidates rather plausibly and impressively what happens if, on the basis of the proxy inputs as manipulated variable, the setpoint position and the setpoint velocity, the robot moves to a position corresponding thereto, then in the course of the localization of a movable object comes into contact with the object, then builds up forces there in the contact, specifically until this spring is tensioned, and then stays there, exerting a constant force on the object and the environment thereof. This is the principle of action of an impedance controller. Such an impedance controller is one possibility for a controller which stabilizes the system or the robot under the prerequisite that contact forces occur and proxy inputs or indirect inputs (the setpoint positions and the setpoint velocity for this controller) are made available.

Why is the Measurement Model Required for the Estimation Problem?

If an attempt is made to estimate the position of the object on the basis of robot positions and contact forces that are measured in some way, then at first sight it is not clear at all what are actually measurements and what is actuation in the sense of mechanically actuate or drive.

One could after all say, for example, tell the robot to move there, and then it measures a force, or I can say that I am in command of the axes, and then it moves to a position. That is to say, therefore, that from the logical order it is not absolutely clear what is actuation and what is measurement. It is moreover actually relevant if consideration is given for example to approaches from the literature which have attempted to solve this problem previously.

What is done in these known approaches is as follows: ultimately the robot position is assumed both as actuation and as measurement and the forces are ignored. Moreover, the following is then stated: the robot is intended to move somewhere and it has moved there and it is known that the objects and the robot do not penetrate one another, that is to say that the measurement model arises exclusively by way of the assumed penetration or non-penetration. It is furthermore known, if the robot were stuck in the object (i.e., there is a penetration), that that is not a plausible state. It is also known, if forces are additionally considered as well, that it can then be stated, for example, that if one feels a force, then one is in contact. That is to say that if one has a hypothesis as to where the object is not in contact, then one knows that this hypothesis is implausible since, after all, one measures a contact.

Such a procedure has clear disadvantages.

The first disadvantage is that no plausible motion model is available if that is done, if positions are virtually taken as a basis as actuation, because there is no meaningful model as to how this possibly jumping quasi position of the robot and object will be harmonized with the dynamics.

The second disadvantage is that the way in which the object should move cannot be meaningfully derived therefrom.

What is then typically done in accordance with the known approaches is that it is assumed that the object simply diffuses through space, possibly also in all six degrees of freedom, as a result of which it thus starts to hover. An attempt is then made to correct this again afterward, and that has two disadvantages.

Firstly, effects such as, for example, that the object is pushed by the robot are not represented in a physically plausible way and, secondly, the full dimensionality of the state space is actually manifested and must be tackled. The object starts to hover, and the object has to be estimated in all six degrees of freedom, although that is not actually desired at all.

With this type of procedure, the problem is both part of the motion model and part of the measurement model.

In order to avoid that, the following is stated in the exemplary embodiment: the control input is the setpoint position of the controller, but the direct manipulated variable that is not modulated externally is the torque that results from the controller in the physics simulator. That ensures that in the physics simulation everything moves in a physically plausible way and then afterward with the measurement model a comparison is made to ascertain whether the simulated axial positions correspond to the measured axial positions. This approach rules out that the objects can be anywhere, rather they are always guaranteed to be in physically plausible states. There is no object that hovers, and there is no object that penetrates another object, e.g., the tabletop, or is penetrated by the robot. That is to say that the measurement model is necessary because the measurement model, as considered in terms of the approach, is physically implausible because the location of the robot is known. Where the robot is known exactly to many decimal places. That is to say that assuming that there would be a deviation there is actually physically implausible. However, it solves a whole series of other problems that can arise or arise around that if other approaches are pursued.

As explained and described above, then, there is the motion model and the system model. If these two models were now combined by simulating the motion model in the physics simulator, a deterministic system would be obtained. It consists simply of an integrator plus a controller, that being deterministic. It is helpful for various reasons to make a probabilistic state estimation such that the system to be considered is nondeterministic; what would actually be desired is for the system to be noisy.

In accordance with the exemplary embodiment of the invention, forces are applied to the objects simply artificially and purely randomly that then drive the objects in this way a little through the area. "Noise" can be applied, however, at quite a large number of different locations in the system described by the system model. In this regard it is possible e.g., to effect any kind of noise inputs in the system model. What is important is that at the end the system is nondeterministic; where and how the "noise" is generated is actually not important. It is only important to have a noisy system.

The forward dynamics in the motion model arise from the block "Forward Dynamics" in Wirnshofer et al. in the pictorial illustration (FIG. 3) by equation (1) being rearranged in chapter III A) and then being solved with respect to the accelerations. The accelerations, described here as "$\ddot{q}^d_r$", are the accelerations both of the robot and of the object and they are dependent on the torques or in a generalized way they are virtually dependent on forces $\tau$ [cf. equation (1) in Wirnshofer et al.] applied to the system.

These generalized forces are composed of the partial forces present at the robot, e.g., the torques in the case of a rotational axis, and other partial forces acting on the object. Since the object is assumed not to be actuated, the partial forces acting on the object, if consideration is given to this in physically plausible terms, are equal to zero. There are no forces there since the gravitational force is already explicitly modulated on the left-hand side of equation (1). There is no force acting on the object otherwise. However, if forces are now applied to the object, e.g., random forces $\tau_O$, then a noisy model is generated here. That is exactly what is thus done [cf. in Wirnshofer et al. in the pictorial illustration (FIG. 3)].

The fact that the motion model is made noisy by way of the forces on the object is an important property of the system model or the integration model presented in (FIG. 3) in Wirnshofer et al. This system is deterministic per se and it has to be made noisy for the filter estimation, and the fact that that is done by way of the forces on the object has the very beautiful property that although the system is artificially noisy afterward, nonetheless only physically plausible states are generated in this way. If an additional force is added to the object, then this object acted on in this way will nevertheless not force itself through some other object, such as e.g., the tabletop, etc. If the object is pulled toward the left, then it slides toward the left over the tabletop; if the object is pulled downward, then it nevertheless remains prone on the tabletop; and if the object is pulled upward a little, then the gravitational force will very likely nevertheless be sufficient for the object to remain prone on the tabletop. That is to say that although the additional force can make the state noisy, the latter is made noisy only in a way that typically the inaccuracies in the process are also manifested, namely the object does not oscillate nor does the object jump all at once to the other side, rather it perhaps shifts a little in the plane, but that would then be it. That all happens owing to the fact that the generalized forces on the object become noisy. That is very generic, and it has very beautiful numerical properties in the filter estimation.

The model is based on common dynamics of robot and object, but robot and object have separate states which could also be made noisy separately if that were desired.

The model combination yields a probability distribution that represents the dynamics of the system, the motion model, and a probability distribution that represents the measurement model, namely the measurements of the axial positions.

On the basis of these two probability distributions, the Bayes filter algorithm in the Bayes filter is now implemented, which estimates the probability distribution over the object position and also the probability distribution over the robot position, although in contrast to the object position the robot position is not really that interesting.

In its pure form the Bayes filter has the property that it cannot be implemented on a computer because continuous probability distributions are estimated there. That is to say that a suitable approximation is needed, i.e., an approximation filter or, to put it more precisely, an approximation algorithm.

From the possible options for this, a particle filter representation is now used [4]. In this case, the probability distribution is represented either by hypotheses or by samples from the probability distribution and this set or cloud of particles obtained here in each case is renewed (updated) step by step.

The particle filter algorithm is a rather simple algorithm that has recourse to two components. This is described in Wirnshofer et al. in chapter IV.

The approximation algorithm and the particle filter algorithm must be able to sample from the motion model and must be able to evaluate the measurement model. As soon as the two components are ready, a generic state estimator is available, whatever the kind of system currently being considered.

With the filter estimation by the Bayes filter algorithm and the approximation by the particle filter algorithm, the intention is in each case to represent a probability distribution step by step (by iteration) in order to be able to estimate where the system is currently situated.

If the motion model is not noisy enough for this, then an effect occurs which is referred to as "particle depletion", according to which all particles end at the same point and the filter estimation has thus collapsed.

This effect, which can generally be observed for all approximation filters, occurs particularly during approximation with a particle filter. From the standpoint of the filter: the filter is one hundred percent certain that the system is now in a specific state, but it is not there, and the filter no longer finds a way out of this dilemma. The filter will then always get stuck at this one point. The filter therefore needs precisely this noisiness in order that the individual distributions diffuse again and the space of the possible states of the system can be established again.

With the Bayes filter and the particle approximation, a probability distribution is currently available regarding the present state of the system. This is referred to as the "belief" about the current state, which is designated by "$x_t$"—in relation to points in time once again with "Y" as index. The current probability distribution is the "belief" of "$x_t$" and that describes where the system currently is at present. Two variables that are known are available. The current control input applied to the system is known, that being "$u_t$" already mentioned, and then there is the current measurement obtained via the system and designated by "$z_t$".

Furthermore, firstly the motion model and secondly the measurement model are available.

The motion model indicates what probability there is in a current state "$x_t$" that one actually knew where one was before, namely in a state "$x_{t-1}$" and the control input. The motion model supplies one with the statement that if one was there and one takes the control input, then the system diffuses somewhere from the probability mass from there to there.

The measurement model supplies the statement, assuming that one was there, regarding what measurement one would obtain with what probability.

If one assumes e.g., that the axis was at an axial position with an angular measure of 100°, then one obtains, e.g., in regard to the already mentioned measurement with Gaussian distribution over the axial position, an axial position which is centered around this 100° angular measure.

The Bayes filter functions according to a very simple scheme. Firstly, the measurement model is utilized in order to be able to predict how the probability distribution will develop, and then afterward to be able to correct the estimation again with the measurement model.

It is assumed that one has the "belief" from the last iteration step, that is the "belief" "$x_{t-1}$", and one has the measurement model. The question now arises as to where one then is afterward, and the probability that one is in a different state afterward is the probability that one went there from a different state multiplied by the probability that one was in this different state previously. A corresponding integration takes place for the entire state space.

To put it another way: when one is somewhere, then one was somewhere else before but one went there.

This is represented in Wirnshofer et al. in equations (4) and (5) in chapter III C).

With the measurement and the probability that one is somewhere since one has obtained a measurement of this point (state), the probability that one is also actually there is multiplied by the probability that, as seen from there, one obtains this measurement and then also normalizes the whole by a normalization constant q, because the probability distribution must be integrated to one afterward, the "belief" is updated. That is already the entire principle underlying the Bayes filter algorithm or the Bayes filter.

Conclusion: One was possibly somewhere and possibly went somewhere; that is a state transition probability which results from the motion update (an update of the motion model), and then a measurement update (an update of the measurement model) is also effected; one might now be somewhere, but one must then also have measured what one has measured and then one knows how probable it is that one is currently somewhere; that is a probability of the measurement.

The Bayes filter algorithm or the Bayes filter is certainly not the only method for estimating states or determining probability distributions, but it would appear to be the only practical method for the present large, complex estimation problem and in principle it forms the starting point for approaching this problem. In order to get a handle on this large, complex estimation problem, which fails even for multidimensional state spaces in the low two-digit range on account of the computational capacity available to normal computers, a suitable approximation, such as by the particle filter algorithm or the particle filter, is necessary anyway—as already mentioned.

With respect to the possible other options that exist in regard to the approximation with respect to the Bayes filter algorithm. The Bayes filter algorithm is the most generic algorithm, which thus typically cannot be implemented with conventional computers against the background of the large, complex estimation problem described above.

Proceeding from the Bayes filter algorithm, there are then various approximations. The particle filter has been mentioned above, for example, in which the probability distribution is approximated by samples.

However, if a few assumptions are made about the probability distributions obtained, e.g., that the latter all have Gaussian distribution and that the system dynamics are linear, then one ends up with a Kalman filter.

If the state space is discretized and a discrete system is assumed, then one ends up with a histogram filter or something similar. In other words, there are various variants for approximating here and there are also mixed forms. In this regard, there are e.g., mixed forms between particle filter and Kalman filter.

For the present large, complex estimation problem, it is perhaps also conceivable that a combination of Kalman filter and particle filter would also work, and possibly also an extended Kalman filter. Whereas a histogram filter actually does not really make sense. Although there is a wide variety of approximations, the particle filter is the approximation with the fewest assumptions and the fewest restrictions but also with the highest computational complexity.

Moreover, the particle filter has to be applied to the measurements and actions iteratively in order then to obtain a state estimation or more precisely a probability distribution as to where the object might then currently be situated, that is to say is localized.

In order, after obtaining the probability distribution, ultimately to obtain from this distribution an estimated state of the object and/or the localized location of the object, various things can now be done. It is possible for example simply to form the mean value of the probability distribution and to take this value for the state estimation. Alternatively, it is also possible to form the mode of the probability distribution.

That is therefore generally a problem of all estimation methods based on the Bayes filter algorithm. If one wants finally actually to have a concrete hypothesis, one must consider what one does with the probability distribution that one has obtained. One obtains a probability distribution over the object position rather than actually an object position, since one will never know where the object is if one considers it systematically correctly.

On the basis of this probability distribution, one may then consider how a concrete hypothesis might appear, which is then used, or whatever one does with the probability distribution obtained.

What then is a Hypothesis?

In this respect, on the basis of the explanations in Wirnshofer et al. in chapter IV, closer consideration will be given to (FIG. 4) and (FIG. 5) contained therein. In this regard, (FIG. 4) in Wirnshofer et al. shows with the illustrated steps I . . . IV a temporal sequence when the Bayes filter algorithm is applied iteratively and for approximation with the particle filter algorithm. These "small boxes" which are colored orange in the illustration there, are hypotheses as to where then the object (as is illustrated e.g., in (FIG. 1) and (FIG. 6) in Wirnshofer et al.) might currently be situated in an environment (as illustrated in the form of the gray tabletop with a gray box e.g., in (FIG. 6) in Wirnshofer et al.).

In (FIG. 4), the robot with a cube as object (green color) is represented in the environment, depicted gray in (FIG. 4). It is initially known, albeit only very roughly, where the cube or object is. In (FIG. 4 in step I) and in (FIG. 5 in the left-hand illustration), there is sampled in each case such a cloud of hypotheses or "small boxes", that is to say particles, which are not all physically plausible. Some of the "small boxes" are lying on the tabletop and the box, and others are hovering in the air; both need not necessarily be physically plausible. Initially they may be totally implausible.

That is the initial state, the initial distribution or the initial "Believe" about an arbitrary starting state of the system. One must start with an initial distribution. One must have some idea of how the system might initially appear.

State distribution is always taken as a basis. What is seen in steps I . . . IV in (FIG. 4) is not four steps of the Bayes filter algorithm with the particle filter algorithm for approximation, rather the Bayes filter with the particle filter is evaluated, in general at 200 hertz, in a loop. This will last a few seconds and in this time the filter has been applied a few hundred times in order to achieve this result.

The initial state need not always appear as it now appears here in step I of (FIG. 4) in Wirnshofer et al. That is merely one example of how the initial state might appear. Alternatively, someone (e.g., a user) who would like to implement a configuration arrangement as in Wirnshofer et al. may say that the robot is situated somewhere above the tabletop, and at this point now causes a cloud of approximately 1000 hypotheses thus to be produced and from then on, the filter then takes over, and effects the update. However, an initial state must be specified in some way. That must be there.

Somewhat more precisely: rather than the initial state, there must be an initial distribution over states.

The initial distribution over the states can simply be specified by whomever in the desired way. No filter at all is required for this. Therefore, the initial distribution chosen in Wirnshofer et al. in step I in (FIG. 4) is physically implausible, the object is not simply in the air, that does not make sense, but implausible states can indeed be specified and, as long as they are approximately within the bounds of what is possible, the whole then swings to physically plausible hypotheses.

One must start with something. One starts with an initial distribution and the result of an application of the filter is a distribution again. That is to say that afterward the configuration arrangement carries on working on its own results.

If the Bayes filter algorithm with the particle filter algorithm for approximation is now applied for the first time, then what is illustrated in (FIG. 5 in the right-hand illustration) happens if the physics simulation causes all "small boxes" to fall over again. The "small boxes" land either somehow on the tabletop or on the box, specifically with any orientation that is physically plausible. Therefore, in comparison with (FIG. 5, left-hand illustration), no "small box" and also no cube remain standing on their edge, rather the box/cube falls on one side. What can also be seen rather well in (FIG. 5 in the right-hand illustration) is the following: there are only a few quasi-discrete Z-positions where the object can be situated because the latter indeed remains prone on one side and the same is also evident for the orientation. This illustration is a little less transparent in this regard but one ends up on one of the corner sides of the cube.

What Happened?

The system stabilized itself during the initial application of the Bayes filter algorithm with the particle filter algorithm on the basis of the physics simulation. In a manner as illustrated e.g., in (FIG. 4 in step I).

Now in accordance with (FIG. 4 in step II) during an implementation of the technical teaching according to embodiments of the invention with a robot on the basis of the setpoint position—given by "$q^d_r$," in Wirnshofer et al. in the pictorial illustration (FIG. 3)—firstly there is movement along the setpoint trajectory (purple path in (FIG. 4 in step II)) and the robot follows this path, of course, and in the process, if it hits the object, it throws the object downward or pushes it to the side and, if it does not hit the object, the latter remains in place.

For the implementation it is known that there is a large number of "small boxes" or hypotheses regarding where the system might currently be, e.g., approximately 1000 in accordance with the implementation carried out in Wirnshofer et al. In each hypothesis or "small box" of these hypotheses or "small boxes", the robot attempts to follow the physics simulator of this path and reacts as described above. That is to say that each of these "small boxes" lies in its own physics simulator, which is noisy, and reacts accordingly to what the robot does there.

In a third step, (FIG. 4 in step III), with the robot once again on the basis of the setpoint position—given by "$q_r^d$," in Wirnshofer et al. in the pictorial illustration (FIG. 3)—there is movement along the setpoint trajectory (purple path in (FIG. 4 in step III)) in the direction of the edge on the tabletop and the robot once again follows this path, of course. Thus, with the robot there is movement toward the edge. Two things can now happen. If the object in the physics simulator were still situated on top of the box there, the robot would run into the edge, if the object is already situated at the bottom—as illustrated—on the tabletop, then the robot runs into the object and gets stuck on the object. This point is the first time that the measurement model thus takes effect correctly, since here there is an actual great deviation between the different hypotheses or "small boxes" regarding where the robot can currently be, and the measurement model accordingly yields different probability values regarding the probability of the measurement currently obtained at present. Moreover, the robot has actually got stuck here. That is to say that, on the basis of the comparison, all that remain are hypotheses or "small boxes" where the robot has actually got stuck. They are those hypotheses or "small boxes" where the object remains prone on the baseplate. In accordance with (FIG. 4 in step IV), apparently only one hypothesis or one "small box" has "survived", while all the other hypotheses or "small boxes", which still lie on top of the box, disappear because those are not physically plausible on the basis of the measurement model.

In the fourth (last) step, (FIG. 4 in step IV), with the robot once again on the basis of the setpoint position—given by "$q_r^d$," in Wirnshofer et al. in the pictorial illustration (FIG. 3)—there is movement along the setpoint trajectory (purple path in (FIG. 4 in step IV)) in the direction of the box on the tabletop, and the robot once again follows this path, of course. Here the hypotheses regarding where the object might currently be situated have virtually settled, specifically virtually to this last hypothesis minus the symmetries. In this regard, it is not possible to distinguish whether the object has now rotated by 180° or not. That is not found out with the application of the teaching according to embodiments of the invention, but at least the position has been estimated very well and the rotation has been limited to a small number of possibilities. In this way, the implementation of the technical teaching of embodiments of the invention would also function in reality.

The setpoint position considered in this implementation is given externally—i.e., predefined externally; it always develops identically and is always the same for all particles, hypotheses, "small boxes". That is predefined externally. That is the action applied to the integration model or the system model [cf Wirnshofer et al. (FIG. 3)]. This integration model or system model becomes part of the motion model and the motion model becomes part of equation (4) in Wirnshofer et al., namely the production of the Bayes filter algorithm or Bayes filter. This can be seen rather well in Wirnshofer et al. in step II in (FIG. 4). There the robot moves in simulation and the objects and the robot move in the manner predicted by the motion model. If the robot runs into the object somewhere, the latter falls down from the box onto the tabletop or the robot pushes it to the side; if the robot does not run into the object, the latter remains where it is. In any case the robot follows the setpoint variable or at least attempts to follow it, specifically on the basis of the controller in the integration model or system model.

The same applies to step III in (FIG. 4) in Wirnshofer et al. Here as well the motion model again also plays a part, that is to say all "small boxes" press against the edge on the tabletop and if no "small boxes" were there—hypothetical assumption—the robot itself would run into the edge and that is then in turn utilized in the measurement model. That takes place on the basis of equation (5) in Wirnshofer et al., where the measurements of the actual axial positions are compared with the measurements of the simulated axial positions. Moreover, on the basis of this measurement comparison, quite a lot of the hypotheses or the "small boxes" then disappear because they are no longer physically plausible.

Why is a Contact Between Robot and Object Necessary?

If it were assumed that the robot would simply stand still and never come into contact with the object, then the implemented particle filter approximation of the Bayes filter algorithm would nevertheless reduce the set of possible object positions to physically plausible hypotheses. Those are then greatly scattered and the object is then smeared over the entire tabletop, but it is always on the tabletop. That is not yet what one actually wants, since the object position is not yet localized, but one has a whole series of configurations where one definitely knows that the object is not there. Moreover, that is something which is helpful as a start, but is not yet what one actually wants to have. In other words, if one really wants to know where the object is, then one must also touch the object afterward using a robot [cf. in Wirnshofer et al. the pictorial illustrations (FIGS. 1, 4 and 5)].

The Significance of the Input Variables for the Estimation Complex Considered and Why?

On the basis of the explanations above, a system is present whose geometry and also dynamics are known in essence. The desire during the estimation, moreover, would be for the state space not to completely explode—in the sense of too many dimensions having to be considered.

If virtually only the movement of the object is considered and the movement of the robot is disregarded and instead the movement is simply assumed to be given, since it is virtually measurable, then there is the problem that physically implausible contacts between robot and object are obtained. The full space containing six degrees of freedom of the object pose then has to be considered, and then has to be rejected again afterward on the basis of the contact situation. Having to consider six dimensions for the estimation with the Bayes filter including the particle filter approximation is too much.

That is to say that if only positions are used for computation, then the system as a whole does not work. The alternative is to include the robot dynamics in the whole system and then use the torques for computation. By virtue of the fact that the torque is an input of the system, the latter behaves physically. That has the advantage that the dynamics of the object become wonderfully physically plausible; with the object no longer having a Z-component, it falls downward in the state space, and if it is pushed by the robot, it then stands still again on account of friction. The state space of the object ultimately collapses to three states, namely the XY-position and the rotation about the Z-axis. Ultimately there are virtually three dimensions to which the system collapses.

The disadvantage is that doing that causes the state space of the robot to completely explode. In this regard, both the positions and the velocities of the robot then have to be taken into account.

In the case of a seven-axis robot, there are then 14 degrees of freedom which additionally have to be considered. That is also too much to do.

In order to get a handle on all that, the following is done. The robot is commanded at the position level, but the controller is interposed, which generates torques from these position variables, specifically on the basis of an assumed robot position supplied by the physics simulator. This gives rise to a situation where both the robot and the object move in a physically plausible manner, since although a physics simulation is used, the robot does not drift wildly through the area, since even in simulations the controller is stabilized with respect to the setpoint variable. That ensures that one obtains the advantages of both approaches, the position- and torque-based consideration, without having the disadvantages of either of the two approaches.

For the implementation of the exemplary embodiment of the invention, five things (points) would be needed in principle. The first is a model of a robot or manipulator and an object. The second is a physics simulator. The third is an actual implementation of a stable controller. The fourth is an initial distribution. The fifth is a model of the noise applied to the object.

In accordance with the document Wirnshofer et al. in chapter V, a model such as is illustrated in (FIG. 4), in (FIG. 5) and in (FIG. 6) in Wirnshofer et al. is assumed as the first thing (first point) for the implementation. These illustrations are all interrelated; in this regard, the green cube (box) represents the actual object position, which the system does not know, of course, and the orange-colored cubes (boxes) are all hypothetical object positions. This model includes everything substantive, such as geometry, masses and kinematics of the robot, the cube and, of course, of the surroundings, such as e.g., the tabletop.

As the second thing (second point), a MuJoCo simulator is used as physics simulator.

As the third thing (third point), the initial distribution of the system state as used in Wirnshofer et al. in (FIG. 5) in the left-hand illustration is used. An arbitrary, uniform distribution of orientations and a Gaussian distribution of translations around a center point on the object are assumed in the initial distribution. That is seen in (FIG. 5) on the left-hand side. There are simply Gaussian-distributed positions and totally uniformly distributed rotations.

As the fourth thing (fourth point), the stable controller used is a Kuka robot, which intrinsically already contains impedance controllers at the axial level.

As the fifth thing (fifth point), for the noise, recourse is had to the "Motion described in Wirnshofer et al. in chapter VI B). Normally distributed forces applied randomly to the centroid of the object are assumed here.

The approach for the probabilistic state estimation or determination of a probability distribution has thus been explained in the context of the exemplary embodiment of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCES

[1] D. J. Duff, J. Wyatt, and R. Stolkin, "Motion estimation using physical simulation," in 2010 IEEE International Conference on Robotics and Automation, May 2010, pp. 1511-1517.
[2] K. Lowrey, J. Dao, and E. Todorov, "Real-time state estimation with whole-body multi contact dynamics: A modified ukf approach," in 2016 IEEE-RAS 16th International Conference on Humanoid Robots, November 2016, pp. 1225-1232.
[3] K. Nottensteiner, M. Sagardia, A. Stemmer, and C. Borst, "Narrow passage sampling in the observation of robotic assembly tasks," in 2016 IEEE International Conference on Robotics and Automation (ICRA), May 2016, pp. 130-137.
[4] https://en.wikipedia.org/wiki/Particle_filter in the version of May 10, 2019

The invention claimed is:

1. A method for a contact-based localization of objects that can be moved when manipulated by a robot, wherein for a state associated with the object localization of a system formed by at least one manipulated-variable-controlled robot, an object that is movable for the robot during the object manipulation and a robot-object environment that enables the object manipulation as system components, and in the course of a system state estimation, the method comprises:
determining, by an iterative-recursive application of a Bayes filter algorithm, a probability distribution that localizes the object, wherein said determining by the iterative-recursive application of the algorithm obtains: (i) state transition probabilities, in a nondeterministic motion model for system simulation, from modeled transitions of states of the system, and fl) measurement probabilities, in a measurement model for system simulation, wherein an initial probability distribution is used at the start;
using an approximation algorithm in the iterative-recursive determination of the probability distribution;
controlling, by a controller execution of a physics simulator with a simulation system state being fed back and, on the basis of a manipulated variable fed to the controller, wherein the controller controls the physics simulator in such a way that during the system state simulation the robot behaves compliantly with respect to the robot-object environment, wherein the physics simulator is configured to use the physics of the system in regard to forces and dynamics and the resultant physical relationships of the system components;
performing model axis-specific measurements, on the robot, wherein measurement results of the axis-specific measurements are axial position, axial velocity, axial acceleration and/or axial torque of a robot ROB, wherein the robot ROB is configured to be manipulated to move the object.

2. The method as claimed in claim 1, wherein said determining the probability distribution comprises using a particle filter algorithm for approximating the Bayes filter algorithm in the iterative-recursive application of the Bayes filter algorithm.

3. The method as claimed in claim 1, wherein the manipulated variable is formed from a setpoint position, setpoint velocity and/or a setpoint acceleration.

4. The method as claimed in claim 1, wherein the controller is operated in an impedance controlled manner which together with the manipulated variable fed to the controller causes the robot to behave compliantly with respect to the robot-object environment.

5. The method as claimed in claim 1, wherein the measurement of the axis-specific measurements are measurement results of axial position, axial velocity, axial acceleration and axial torque of the robot ROB.

6. The method as claimed in claim 1, said method further comprising:
   forming a multiplicative combination of the measurement probabilities and system state transitions probabilities.

7. A computer program product, comprising a computer readable hardware storage device having computer readable program code stored therein, said program code executable by a processor of a computer system to implement a method for a contact-based localization of objects that can be moved when manipulated by a robot, wherein for a state associated with the object localization of a system formed by at least one manipulated-variable-controlled robot, an object that is movable for the robot during the object manipulation and a robot-object environment that enables the object manipulation as system components, and in the course of a system state estimation, the method comprises:
   determining, by an iterative-recursive application of a Bayes filter algorithm, a probability distribution that localizes the object, wherein said determining by the iterative-recursive application of the algorithm obtains: (i) state transition probabilities, in a nondeterministic motion model for system simulation, from modeled transitions of states of the system, and (ii) measurement probabilities, in a measurement model for system simulation, wherein an initial probability distribution is used at the start;
   using an approximation algorithm in the iterative-recursive determination of the probability distribution;
   controlling, by a controller execution of a physics simulator with a simulation system state being fed back and, on the basis of a manipulated variable fed to the controller, wherein the controller controls the physics simulator in such a way that during the system state simulation the robot behaves compliantly with respect to the robot-object environment, wherein the physics simulator is configured to use the physics of the system in regard to forces and dynamics and the resultant physical relationships of the system components;
   performing model axis-specific measurements, on the robot, wherein measurement results of the axis-specific measurements are axial position, axial velocity, axial acceleration and/or axial torque of a robot ROB, wherein the robot ROB is configured to be manipulated to move the object.

8. The computer program product as claimed in claim 7, wherein said determining the probability distribution comprises using a particle filter algorithm for approximating the Bayes filter algorithm in the iterative-recursive application of the Bayes filter algorithm.

9. The computer program product as claimed in claim 7, wherein the manipulated variable is formed from a setpoint position, setpoint velocity and/or a setpoint acceleration.

10. The computer program product as claimed in claim 7, wherein the controller is operated in an impedance controlled manner which together with the manipulated variable fed to the controller causes the robot to behave compliantly with respect to the robot-object environment.

11. The computer program product as claimed in claim 7, wherein the measurement results of the axis-specific measurements are measurement results of axial position, axial velocity, axial acceleration and axial torque of the robot ROB.

12. A robot control system for the contact-based localization of objects that can be moved when manipulated by robot, characterized by the computer program product as claimed in claim 7 for carrying out the method.

13. The robot with a robot control system as claimed in claim 12.

14. The computer program product as claimed in claim 7, said method further comprising:
   forming a multiplicative combination of the measurement probabilities and system state transitions probabilities.

* * * * *